United States Patent
Vasilieff et al.

(10) Patent No.: US 10,276,158 B2
(45) Date of Patent: Apr. 30, 2019

(54) SYSTEM AND METHOD FOR INITIATING MULTI-MODAL SPEECH RECOGNITION USING A LONG-TOUCH GESTURE

(71) Applicant: AT&T Intellectual Property I, L.P., Atlanta, GA (US)

(72) Inventors: Brant J. Vasilieff, Glendale, CA (US); Patrick Ehlen, San Francisco, CA (US); Michael J. Johnston, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 35 days.

(21) Appl. No.: 14/529,766

(22) Filed: Oct. 31, 2014

(65) Prior Publication Data

US 2016/0124706 A1   May 5, 2016

(51) Int. Cl.
*G10L 15/22* (2006.01)
*G06F 3/16* (2006.01)
*G06F 3/0488* (2013.01)
*G06F 3/0484* (2013.01)

(52) U.S. Cl.
CPC ............ *G10L 15/22* (2013.01); *G06F 3/0488* (2013.01); *G06F 3/04842* (2013.01); *G06F 3/167* (2013.01); *G10L 2015/223* (2013.01); *G10L 2015/228* (2013.01)

(58) Field of Classification Search
CPC ...................... G10L 2015/22; G10L 2015/226
USPC .................................................. 704/270, 275
See application file for complete search history.

(56) References Cited

U.S. PATENT DOCUMENTS

| | | | | |
|---|---|---|---|---|
| 6,040,824 A * | 3/2000 | Maekawa | ........... | G01C 21/3614 |
| | | | | 345/173 |
| 7,630,901 B2 | 12/2009 | Omi | | |
| 8,090,738 B2 | 1/2012 | Paek et al. | | |
| 8,219,406 B2 | 7/2012 | Yu et al. | | |
| 8,738,380 B2 | 5/2014 | Baldwin et al. | | |
| 9,613,020 B1 * | 4/2017 | Jacobs, II | ............... | G06F 17/50 |
| 2001/0047251 A1 * | 11/2001 | Kemp | ................. | G06F 17/5004 |
| | | | | 703/1 |
| 2006/0225003 A1 * | 10/2006 | Agogino | ................. | G06F 17/50 |
| | | | | 716/102 |
| 2010/0241431 A1 * | 9/2010 | Weng | ...................... | G06F 3/038 |
| | | | | 704/257 |
| 2010/0241973 A1 | 9/2010 | Whiddett | | |

(Continued)

OTHER PUBLICATIONS

There. (n.d.). Dictionary.com Unabridged. Retrieved Nov. 9, 2016 from Dictionary.com website http://www.dictionary.com/browse/there.*

(Continued)

*Primary Examiner* — Shaun Roberts

(57) ABSTRACT

A system, method and computer-readable storage devices are disclosed for multi-modal interactions with a system via a long-touch gesture on a touch-sensitive display. A system operating per this disclosure can receive a multi-modal input comprising speech and a touch on a display, wherein the speech comprises a pronoun. When the touch on the display has a duration longer than a threshold duration, the system can identify an object within a threshold distance of the touch, associate the object with the pronoun in the speech, to yield an association, and perform an action based on the speech and the association.

15 Claims, 7 Drawing Sheets

(56) References Cited

U.S. PATENT DOCUMENTS

| | | | |
|---|---|---|---|
| 2010/0281435 | A1 | 11/2010 | Bangalore et al. |
| 2011/0022393 | A1 | 1/2011 | Waller et al. |
| 2012/0105257 | A1 | 5/2012 | Murillo et al. |
| 2012/0280915 | A1 | 11/2012 | Kyllonen et al. |
| 2013/0030815 | A1 | 1/2013 | Madhvanath et al. |
| 2013/0124153 | A1* | 5/2013 | Balistrieri ............... G06F 17/50 703/1 |
| 2013/0307788 | A1 | 11/2013 | Rao et al. |
| 2014/0104197 | A1* | 4/2014 | Khosravy .......... G01C 21/3664 345/173 |
| 2014/0108019 | A1 | 4/2014 | Ehsani et al. |
| 2014/0195911 | A1 | 7/2014 | Cho |
| 2014/0303937 | A1* | 10/2014 | Zayic ..................... G06F 17/50 703/1 |

OTHER PUBLICATIONS

Hoste et al., "SceeG: A Multimodal Speech- and Gesture-based Text Input Solution," Proceedings of the International Working Conference on Advanced Visual Interfaces. ACM, 2012, 8 pages.

Oviatt Sharon, "Multimodal Interfaces", Chapter to appear in *Handbook of Human-Computer Interaction,* (3rd ed., edited by J. Jacko), Lawrence Erlbaum: New Jersey, 2012, pp. 1-30.

Sim, Khe Chai., "Speak-as-you-swipe (SAYS): a multimodal interface combining speech and gesture keyboard synchronously for continuous mobile text entry." *Proceedings of the 14th ACM international conference on Multimodal interaction.* ACM, 2012, pp. 1-22.

\* cited by examiner

SYSTEM AND METHOD FOR INITIATING MULTI-MODAL SPEECH RECOGNITION USING A LONG-TOUCH GESTURE

BACKGROUND

1. Technical Field

The present disclosure relates to multi-modal inputs and more specifically to touch gestures to initiate multi-modal speech recognition.

2. Introduction

Prior to multi-modal speech recognition and multi-modal interfaces, users would first select an item on a user interface, then provide verbal commands unimodally. In this way, users could only perform one task at a time, and in certain orders. Multi-modal speech recognition enhances this workflow by allowing object manipulation and speech recognition to occur in parallel and removing much, but not all, of the unimodality of the input. Multi-modal interfaces in which the user can both verbally ask, while also physically manipulating things, typically require two physical steps. First, the user initiates the speech recognition session. Second, the user physically manipulates things while talking Examples include a user asking for "Restaurants nearby" while touching a listing of a movie theater already on the screen. In such an example, the user would typically touch a listen button, start speaking, and try to quickly touch on the movie listing while speaking "Restaurants nearby here."

In another example, the user asks "What times is this playing?" In this case, "this" is a pronoun referring to the item that was either already selected before the utterance, or selected during the utterance. Normally the user would start the recording for speech recognition, then perform a separate gesture of tapping on the item of interest while uttering a verbal query. For example, while picking a movie from a list, the user might say "What times is this playing?" or "What are the reviews for this one?" or "Add this to my plan." These examples can be difficult, can take a significant amount of time (especially for repetitive actions), and often require some level of user training to use, as the interaction steps are not immediately intuitive for users.

Multi-modal gestures that involve combinations of touch/pen and voice require a user action that explicitly activates speech recognition to initiate and control the capture of audio. One alternative is to leave the microphone on ("open mic"), but this is not practical or desirable in mobile devices due to reasons such as privacy concerns, battery life, and ambient noise. The problem with current solutions of using a "click to speak" or "click and hold" button (either soft- or hard-wired) is that the user must take multiple steps to issue a multi-modal command, and this can lead to confusion and errors.

DETAILED DESCRIPTION

A system, method and computer-readable storage devices are disclosed which enable multi-modal interactions with a system via a long-touch gesture on a touch-sensitive display. A system operating per this disclosure can receive a multi-modal input including speech and a touch on a display, and the speech can include an explicitly uttered pronoun or the speech can reference an implicit pronoun. When the touch on the display has a duration longer than a threshold duration, the system can identify an object within a threshold distance of the touch, associate the object with the pronoun in the speech, to yield an association, and perform an action based on the speech and the association.

This approach uses some feature, attribute, or characteristic of a touch gesture on a graphical display, such as duration, pressure, or movement pattern, to initiate recognition of multi-modal commands, such as speech commands, without using a separate explicit action solely to activate speech recognition. For example, the same single touch gesture can simultaneously indicate the target of the speech input, as well as initiate or activate the speech recognition. This can provide a more natural and intuitive user experience. In this approach, features of the gesture made by the user (such as touch duration) are used to trigger initiation and collection of speech audio. As a result, the user only has to touch the object they are referring to in the multi-modal command, simplifying the interaction. Thus, multi-modal interaction becomes more natural, and easier for the user to learn.

Normally, the user would be required to start the recording for speech recognition, then perform a separate gesture of tapping on an item of interest while uttering a verbal query. A long-touch gesture, for example, can allow the recording to be triggered by the touch of the object, simplifying the interaction. Compared to "open mic" implementations, this solution limits problems from ambient noise, alleviates privacy concerns, and avoids unnecessary use of battery and network bandwidth.

Such a system for initiating multi-modal speech recognition can be constructed in various embodiments and configurations. Some of the various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of multi-modal systems will then follow.

Figure 1:
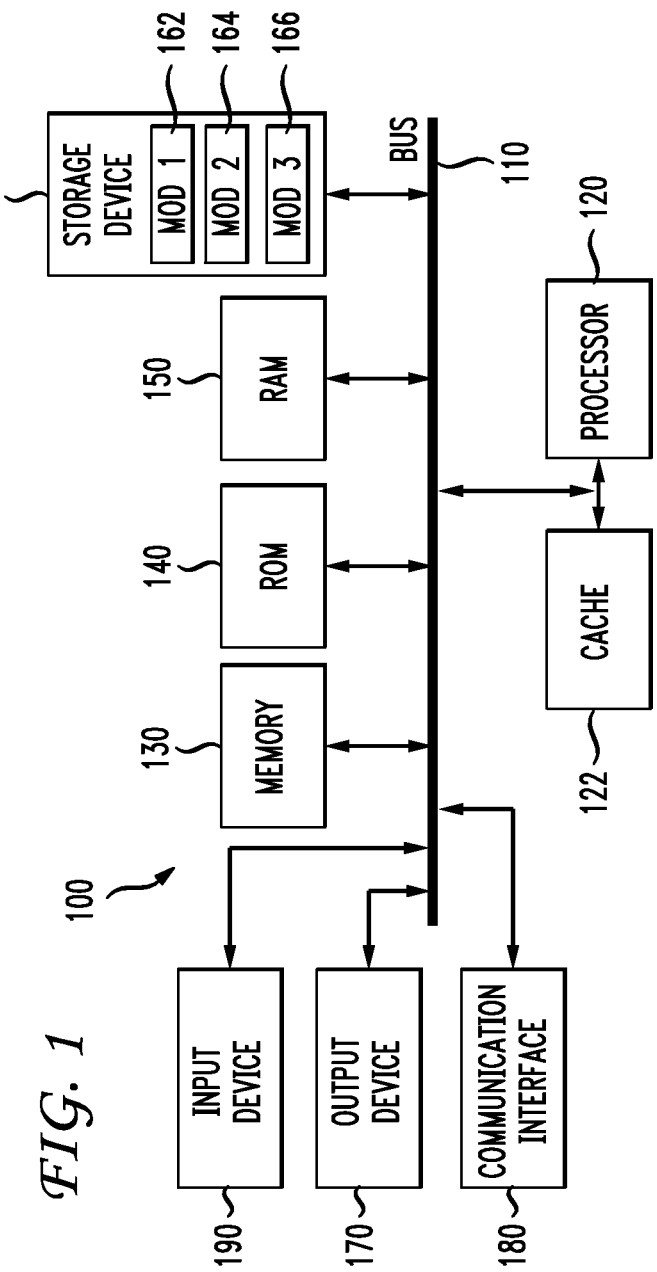
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multi-modal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1

162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Having disclosed some components of a computing system, the disclosure now returns to a discussion of initiating and processing multi-modal interactions. Long-touch gestures can trigger the recording and/or speech recognition by the touch of a desired object, thereby simplifying and streamlining the interaction for the user. The example system is discussed herein in terms of two main modes for a long-touch to initiate a multi-modal speech recognition session. In mode 1, the system starts recording immediately, although the system prepares to abort upon later determining that the touch was not long enough to qualify as a long-touch. In mode 2, the system postpones or delays recording until the touch is determined to be long enough, i.e. exceeds a time threshold.

Normally, in order to initiate a Multi-Modal Speech-Recognition session, the user must touch a talk button or equivalent to start the recording or speech input. During the speech input, the user can then touch an item in the interface while then speaking their verbal query or command. The approach set forth herein allows the user to perform multiple actions simultaneously with a single input, rather than requiring the user to perform actions serially, or one at a time.

Figure 2:
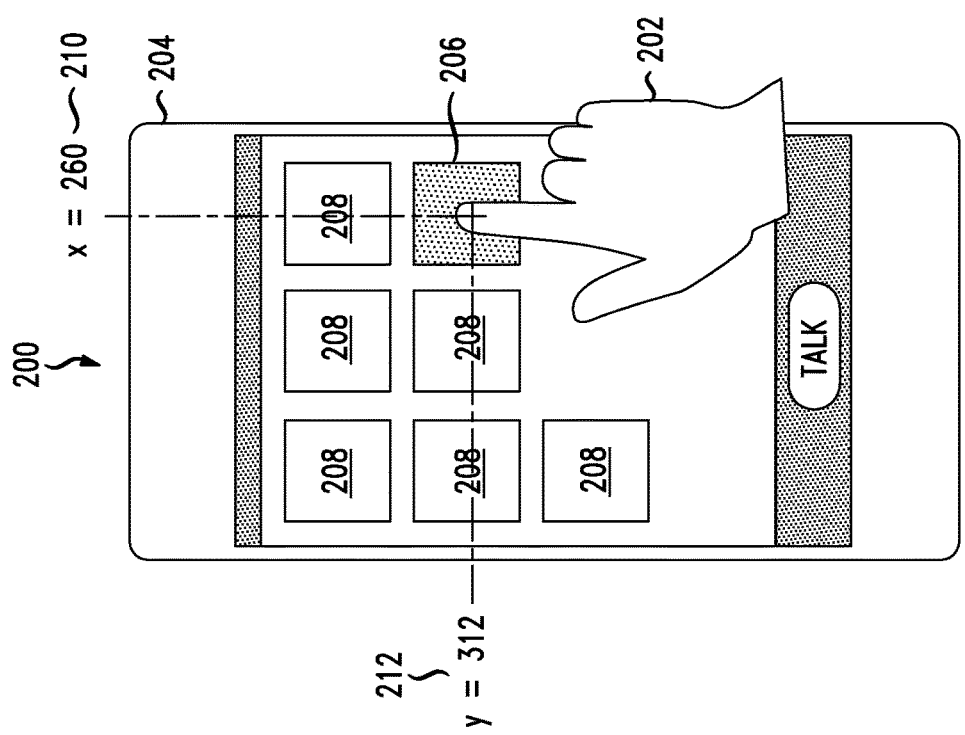
FIG. 2 illustrates a first example user interface demonstrating a tap and hold on an icon.

FIG. 2 illustrates a first example user interface 200 demonstrating a tap and hold on an icon. A user's hand or finger 202 taps on an icon or item 206 rendered or presented on a display of a mobile device 204. In this example, the tap registers at coordinates 210, 212 indicated as x position 260 and y position 312 on the display. In this way, the user can tap and hold on the item 206, indicating that the user wishes to provide a spoken command, spoken query, or other speech input relating to that item 206.

Figure 3:
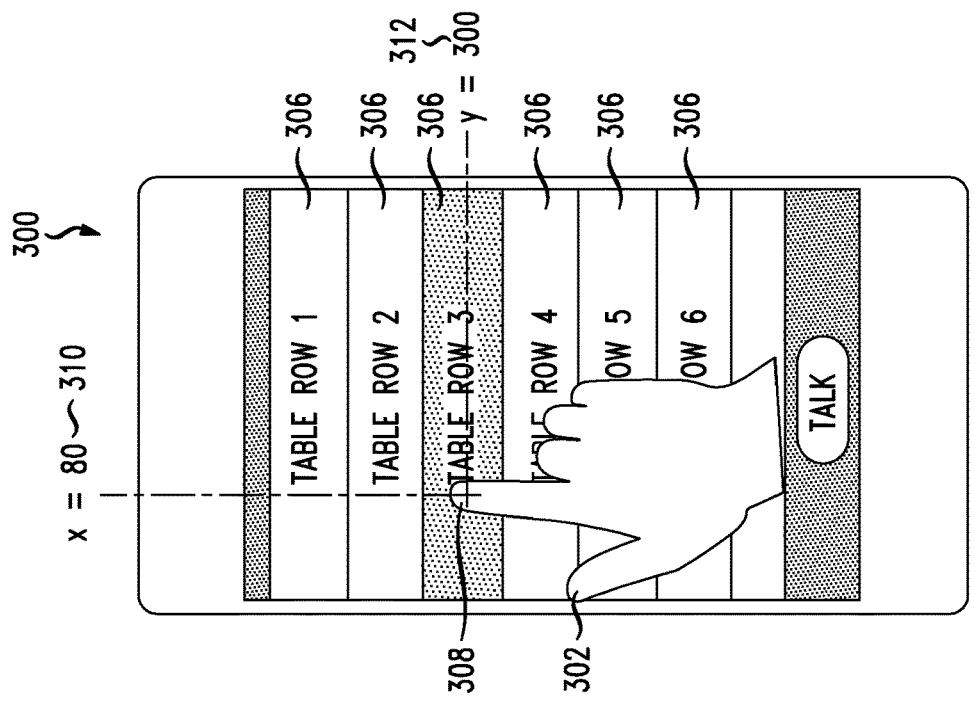
FIG. 3 illustrates a second example user interface demonstrating a tap and hold on an item in a list.

FIG. 3 illustrates a second example user interface 300 demonstrating a tap and hold on an item in a list. A user's hand or finger 302 taps on a row 306 rendered or presented in a list on a display of a mobile device 304. In this example, the tap registers at a position 308 represented by coordinates 310, 312 indicated as x position 80 and y position 312 on the display. In this way, the user can tap and hold on the row 306, indicating that the user wishes to provide a spoken command, spoken query, or other speech input relating to that row 306.

Figure 4:
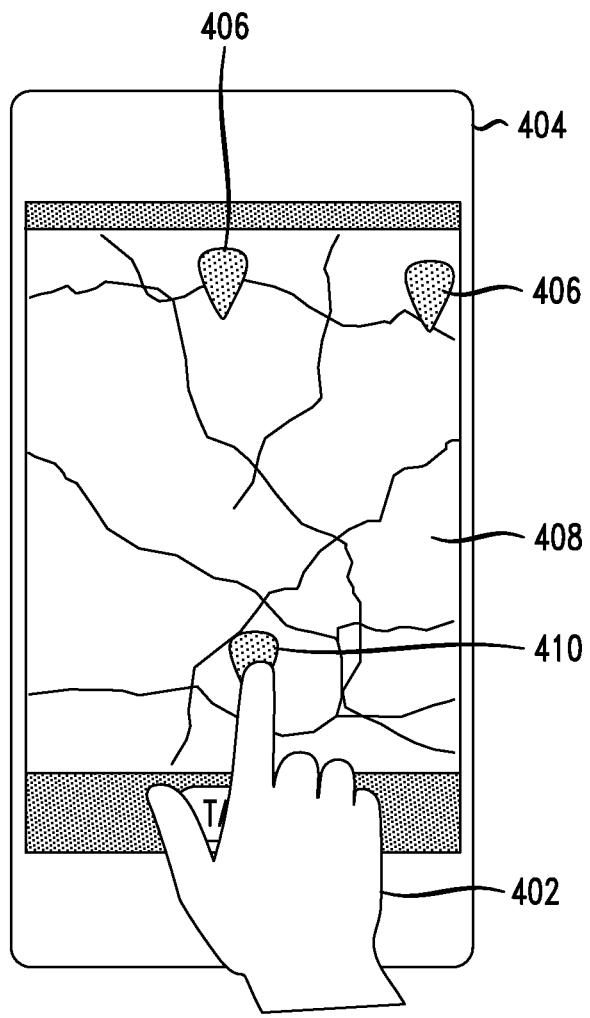
FIG. 4 illustrates a third example user interface demonstrating a tap and hold on a graphical item.

FIG. 4 illustrates a third example user interface for a multi-modal device 404 demonstrating a tap and hold on a graphical item that is not fixed in a rigid format such as a grid of icons or a list of rows as shown in FIGS. 2 and 3. The multi-modal device 404 (or collection of devices) presents on a display a graphical interface such as a map 408. The map 408 can include multiple points of interest, indicated as pins 406. On the map 408 the user 402 can tap and hold on one of the pins 410 or on some other point on the map 408. The system receives coordinates of the tap and hold as well as the gesture information, so that the system can apply or process the tap and hold and the voice input according to additional business logic. As shown in FIGS. 2-4, long touch gestures can be utilized with virtually any type of object or control on the screen, including cells in tables, buttons, images, radio buttons, checkboxes, maps, pins on a map, text, tags, videos, standard user interface elements, video controls, and other visual elements. The timing of the long touch gestures can also indicate interactions with linear media or streamed media. The system can track and consider the coordinates of a click or touch gesture as well as the gesture information.

The system can report coordinates of the touch differently for different gestures, or for different contexts. In some cases, the system can report multiple sets of coordinates for a same touch gesture, where each of the multiple sets of coordinates has a different meaning for a different object. For example, if the user touches a cell in a spreadsheet, the sets of coordinates can include a first set of pixel coordinates referring to where the touch was on the screen, and a second set of cell coordinates referring to a selected cell in the spreadsheet. The sets of coordinates can include the point within the actual deepest object, or any coordinates along the chain of object's parent views. This gives the system with all of the information needed to make further business logic based on listings, where in the cell it was selected, or where on map selection was made. Each set of coordinates can include more than a pairing of two values, and can include three or more values, which can represent values such as depth, duration, timing, and so forth.

Figure 5B:
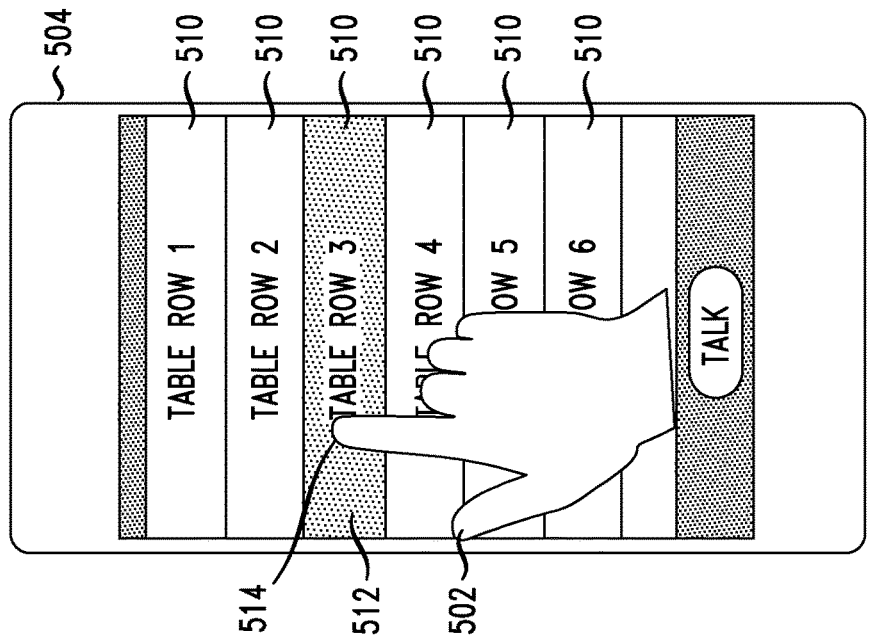
FIG. 5B illustrates the fourth example user interface at a time $T_2$.
Figure 5A:
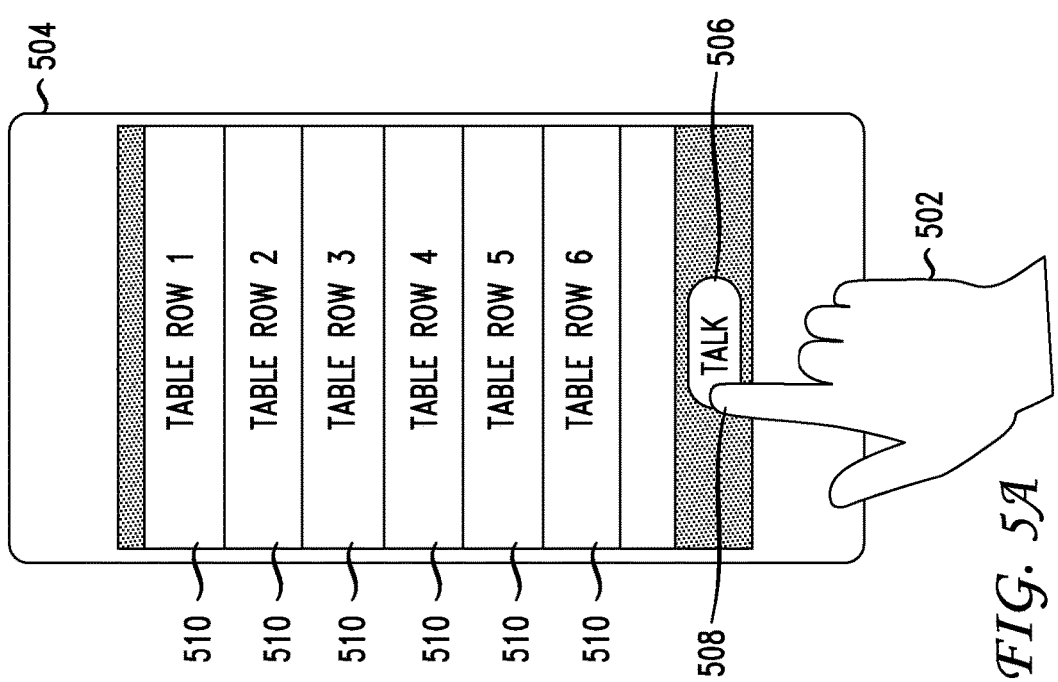
FIG. 5A illustrates a fourth example user interface at a time $T_1$.

FIG. 5A illustrates a fourth example user interface at a time $T_1$ and FIG. 5B illustrates the fourth example user interface at a time $T_2$. In this example, FIG. 5A shows that the user 502 can click or tap with a finger 508 on a talk button 506 presented on a display of a mobile device 504 to initiate multi-modal communication. Then, in FIG. 5, the user 502 moves the finger to location 514 on the display without picking up his or her finger 508. Location 514 indicates one of the rows 510 in the table on the display. In this way, the user can tap and hold on the talk button 506, then slide his or her finger up to the desired point on the screen in a single continuous gesture. This can simplify and streamline the initiation of multi-modal input.

The system can process multi-modal input in other variations which have different timings. For example, in a first mode, the system initiates voice input and/or recording when the touch begins, without knowing and regardless of an eventual length of the touch. When the touch ends, if the touch is sufficiently long, the system continues accepting speech input, and if not, the system aborts speech input or recording.

Figure 6:
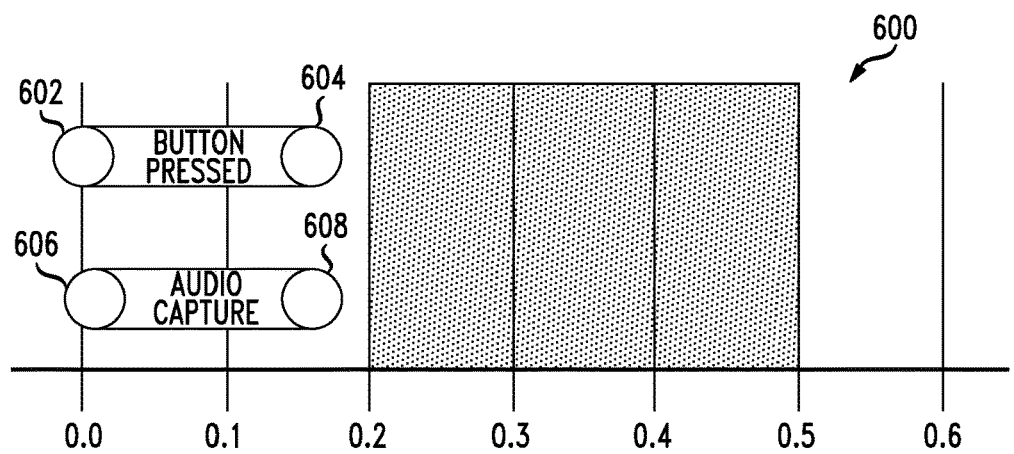
FIGS. 6-8 illustrate three different example timelines of a button press and audio capture for multi-modal input.

FIG. 6 illustrates a first example timeline 600 of a button press and audio capture for multi-modal input. In this example, the button press starts 602 (0.0 s) and the audio capture starts 606 (0.01 s). In this case, the duration of the button press was insufficient to trigger the multi-modal input, so the audio capture stops when the button press ends 604 (0.15 s), 608 (0.16 s). The threshold for the duration of the button press can vary, and may depend on the type of application, a user preference, whether any speech commands were detected during the audio capture between the start 606 and stop 608, the accuracy or confidence in the speech commands, the relevancy of the speech commands, and so forth. The user touches an object on the display at a reference point of 0.0 seconds. The system begins audio capture after a small latency later, to account for the processing time required to understand that the touch gesture has started, but at substantially the same time as the touch gesture starts. If the touch gesture ends without satisfying the threshold for a long-touch, the system treats the touch gesture as a short touch and aborts the audio capture. If the system determines that the touch is also not a scroll or swipe gesture, then the system can, for example, treat the touch as a selection of the object.

In this mode, the system starts recording when the touch starts so that the user doesn't have to wait for any visual clue to start talking and does not have to rely on timing their utterances with their touch of the interface. However, the user may not have a visual indication that the recording has started. The system can optionally provide a slightly delayed visual, audible, vibration, or other indication that the recording has started. The speech capture engine can postpone attempting to send speech data to a network-based speech processor until a minimum long-touch threshold is satisfied. If that threshold is not satisfied, the system can cancel the speech capture before any data is sent to the server. This approach can reduce less useful or undesired traffic to the network-based speech processor and associated servers and network infrastructure. This approach can also reduce the processing load on the network-based speech processor and provide time to present a recording interface on the multi-modal input device. If the system does not detect speech or noise above a desired threshold from the audio capture, the system can prevent or stop transmitting audio data to the network-based speech processor.

Figure 7:
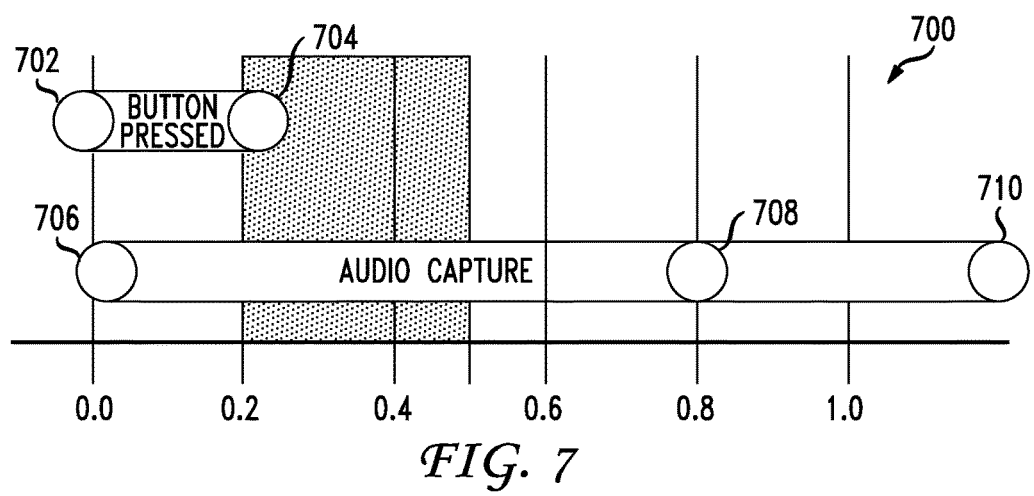

FIG. 7 illustrates a second example timeline 700 of a button press and audio capture for multi-modal input. At time 702 (0.0 s), the user touches the screen. At time 706 (0.01 s), the system starts audio capture. At time 704 (0.2 s), the touch gesture ends, and the system determines that the touch has exceeded the threshold for a long-touch, but has not met the threshold of a push-and-hold gesture. The system treats the gesture as a valid long touch and thus continues the audio capture. At time 708 (0.8 s), the system does not detect any additional audio. At time 710 (1.2 s), the system determines that the audio is still silent, and stops the audio capture or recording, and continues to process the multi-modal request, including the speech input and optionally the gesture input.

Figure 8:
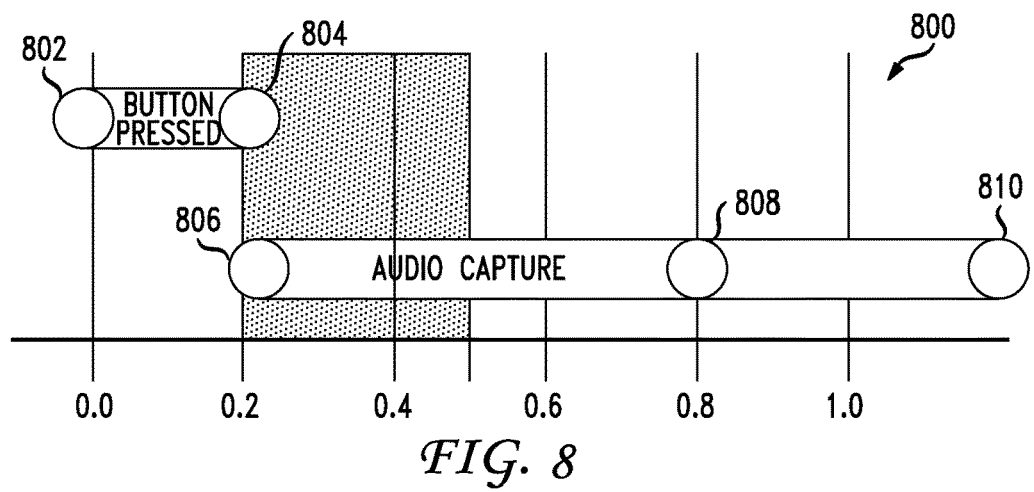

FIG. 8 illustrates a third different example timeline 800 of a button press and audio capture for multi-modal input. At time 802 (0.0 s), the user touches the screen. At time 804 (0.2 s), the touch gesture continues, and the system determines that the touch has exceeded the threshold for a long-touch and continues longer. At time 806 (0.21 s), the system starts audio capture. At time 808 (0.8 s), the touch gesture continues on, and exceeds the press-and-hold threshold, so the system will stop recording when the touch gesture ends. At time 810 (1.2 s), the touch gesture ends, and the system stops audio capture as well. The system can then process or continue to process the multi-modal request to return a result. In this example, the system waits to initiate the audio capture until the touch gesture has been determined to be a long-touch. While this approach can be user-friendly and privacy-conscious, the system has a delay after the touch gesture starts to when the audio capture starts, thereby requiring the user to wait to speak until the touch gesture has been determined to be long enough. In any of these examples, the system can terminate, prevent, or stop transmitting audio data to the network-based speech processor if no audio is detected or if the audio levels are below a noise threshold.

In a separate short touch example, the user touches an object on the screen at time 0.0 s. The touch gesture stops at time 0.05 s, and the system determines that the duration of the touch gesture is below the long touch gesture threshold. Thus, when the touch gesture ends, the system can treat the touch gesture as a short touch and never starts audio capture. If the system determines that the touch is also not a scroll or swipe gesture, then the system can, for example, treat the touch as a selection of the object.

In a separate long touch gesture example, the user touches an object on the screen at time 0.0 s. The touch gesture ends at time 0.2 s, which in this case is after the threshold for a long touch gesture. Because the touch gesture is a long touch, the system initiates audio capture at time 0.21 s. At time 0.8 s, the system determines that the audio capture does not detect any more audio. The system continues to listen for additional speech, and at time 1.2 s, the audio capture is still silent, so the system stops the audio capture and continues to process the multi-modal input.

In a press and hold gesture example, the user touches an object on the screen at time 0.0 s. The touch gesture continues on and, at time 0.2 s, exceeds the example long-touch threshold. Shortly thereafter, at time 0.21 s, the system begins audio capture. At time 0.5 s, the touch gesture continues on, and exceeds the example press-and-hold threshold. During this time, the audio capture continues. Then, at time 0.7 s, the touch gesture ends. Shortly thereafter, at time 0.71 s, the system stops the audio capture, and continues to process the multi-modal input or commands to generate, return, or receive a result. In each of the examples provided herein, the long touch described can be completely on, partially on, or near a particular item on the display. The system can, for example, capture the actual touch and hit points. Further, touching multiple items can indicate certain items as first, second, . . . n-th items of interest.

Figure 9A:
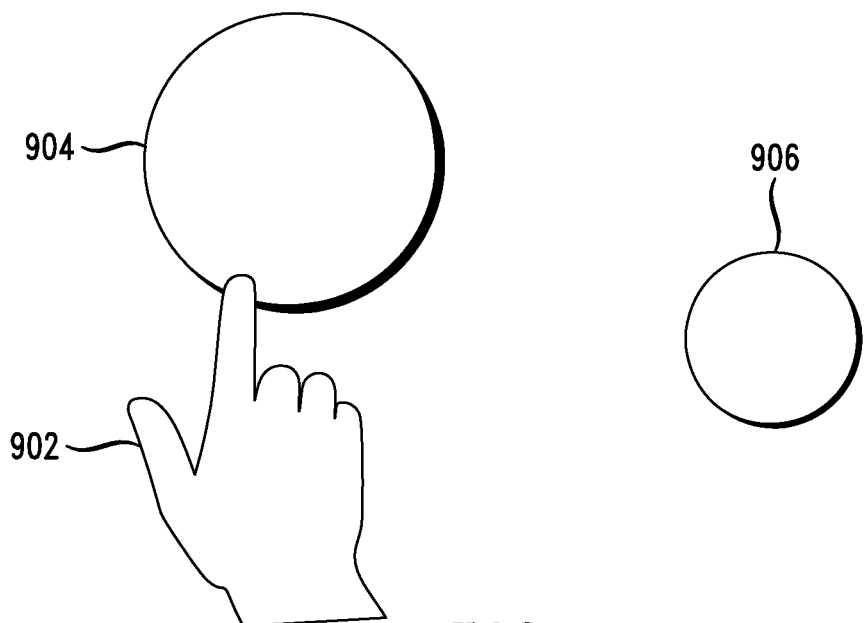
FIGS. 9A and 9B illustrate example additional interactions associated with a touch and hold input gesture.
Figure 9B:
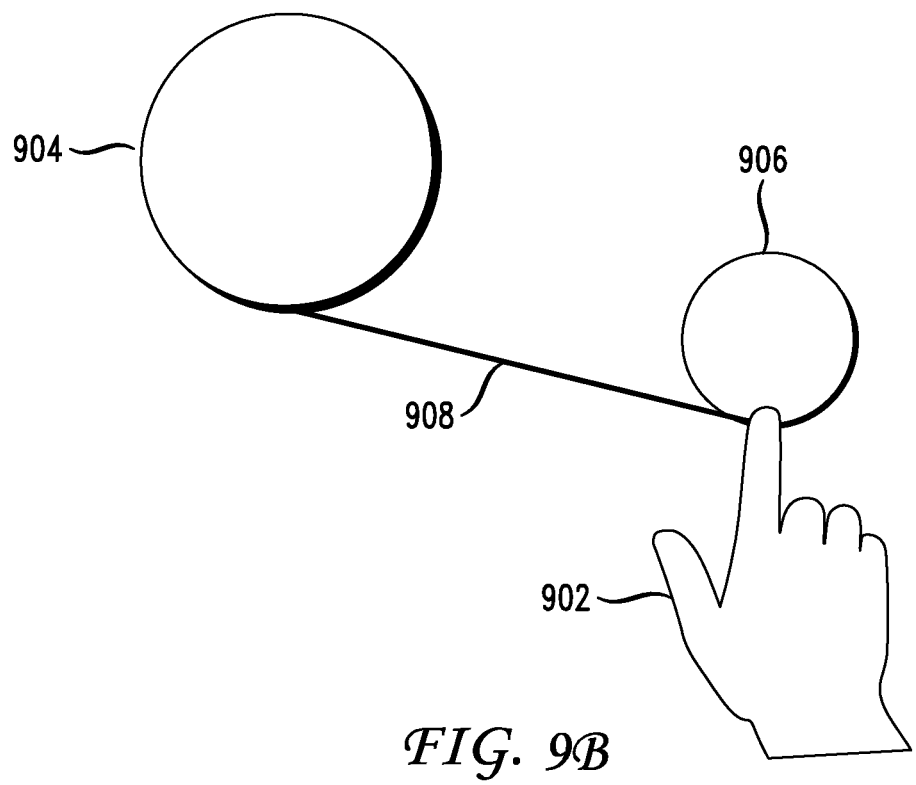

FIGS. 9A and 9B illustrate more complex object manipulations associated with a touch and hold input gesture in a multi-modal environment. Using the same long-touch detection, a drawing program could utilize the initiated multi-modal speech recognition to perform something like "Draw a line tangent from this circle to the tangent of this circle" or "Draw a line tangent to these two circles." In this model, the initial touch gesture isn't destroyed, but rather allowed to continue to manipulate the object in a multi-modal environment. This allows for dual forms of input (touch and voice) to perform complicated multistep actions without having to repurpose the touch gesture in between in order to select the type of line connection. In this example, the user 902 can touch the first circle 904 as shown in FIG. 9A and provide speech input "draw a line from this circle" and then provide a second touch or drag the touch input to the second circle 906 as shown in FIG. 9B, and provide speech input "to this circle." The user can select other objects in order to perform operations with two or more objects. In other words, the traditional way of accomplishing this interaction would to select the line tool from a pallet, select "Tangent to" from an endpoint pallet, select the circle you want to draw tangent from, select "Tangent to" again from an endpoint pallet, and select the second circle you want to draw tangent to. Instead, this approach streamlines the operations, allowing the user to employ multi-modal voice interaction initiated by a long-touch. The user can perform a long-touch on the first circle then let go, say "Draw a line tangent to these circles," and while speaking, or soon after, touch, tap, or click on the second circle.

Figure 10:
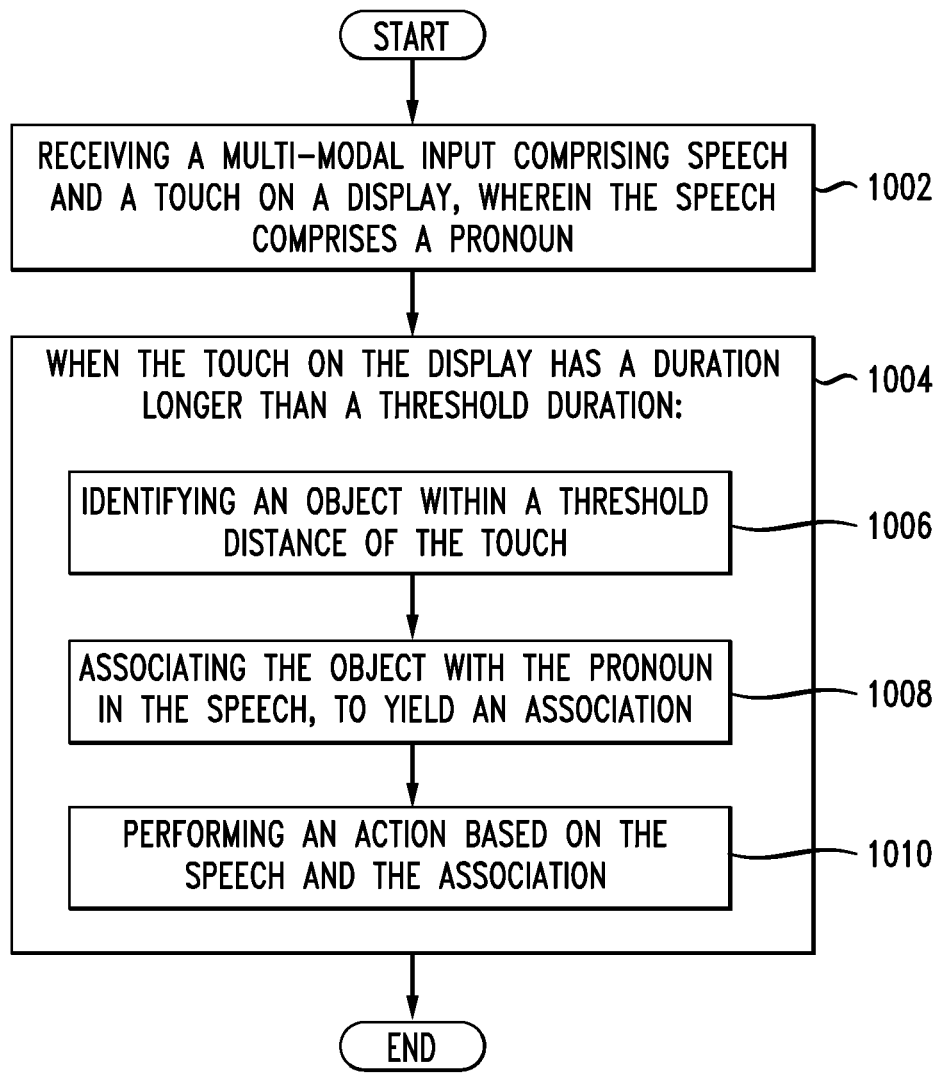
FIG. 10 illustrates an example method embodiment.

Having disclosed some basic system components and concepts, the disclosure now turns to the exemplary method embodiment shown in FIG. 10. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

A system implementing the method of multi-modal interactions via a long-touch gesture on a touch-sensitive display can receive a multi-modal input including speech and a touch on a display, and the speech can include a pronoun (1002). While the pronoun can include an explicitly uttered pronoun such as "he," "she," "it," "they," "this," "that," or "those," implicitly referenced pronouns can also be considered to be included in the speech. Users of multimodal systems often provide speech that is telegraphic and does not include an explicit pronoun, deictic or otherwise. For example, if the system displays to the user multiple restaurants on a map, the user may input a long touch on or near one of them, combined with speech with or without a pronoun. Examples of user speech with explicit pronouns or equivalents can include "review for this restaurant," "review for this," "get me their review." However, more terse users may simply say "review," which does not include a pronoun at all. So the system can reference the context of the speech to infer a pronoun from the speech. In the case of "review" in conjunction with a long touch on or near one of the restaurants on the map, the system can infer a pronoun "review [for this]," where "this" refers to the restaurant indicated on the map by the long touch.

When the touch on the display has a duration longer than a threshold duration (1004), the system can identify an object within a threshold distance of the touch (1006), associate the object with the pronoun in the speech to yield an association (1008), and perform an action based on the speech and the association (1010). The display can optionally present a computer-aided design program, and the action can modify a design within the computer-aided design program. The system can further receive a second touch on the display, if the action requires the second touch.

The threshold duration can be based on a context for the touch on the display, or on a recognition certainty of a command recognized in the speech, for example. The object can be identified based, at least in part, on the pronoun in the speech. The speech of the multi-modal input can be received simultaneously with initiation of the touch on the display, after a duration of the touch on the display is determined to meet a long touch threshold, or after a duration of the touch on the display is determined to meet a press and hold threshold.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to virtually any hardware and/or software application to include or enhance multi-modal speech recognition and dialog support, including both consumer and enterprise applications, Internet search providers, mobile phone makers, network operators, and vendors of multi-modal and spoken language interactive systems. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
    receiving a multi-modal input comprising speech and a single touch on a display, the single touch being at a single point; and
    when the single touch on the display has a duration longer than a threshold duration:
        identifying, based at least in part on a pronoun in the speech, a first set of coordinates having a first meaning for a first object;
        identifying, based at least in part on the pronoun in the speech, a second set of coordinates having a second meaning for a second object;
        associating the first object and the second object with the pronoun in the speech, to yield an association; and
        performing an action based on the speech and the association.

2. The method of claim 1, wherein the pronoun comprises one of I, you, he, she, her, him, they, them, their, my, me, it, we, who, us, what, which, whose, whom, himself, herself, itself, myself, someone, anybody, anyone, ours, this, some, none, whichever, those, that, these, neither, nothing, one, each, everyone, everybody, everything, all, some, and most.

3. The method of claim 1, wherein the pronoun is implied in the speech.

4. The method of claim 1, wherein the threshold duration is based on a context for the single touch on the display.

5. The method of claim 1, wherein the threshold duration is based on a recognition certainty of a command recognized in the speech.

6. The method of claim 1, wherein the speech of the multi-modal input is received simultaneously with initiation of the single touch on the display.

7. The method of claim 1, wherein the speech of the multi-modal input is received after a duration of the single touch on the display is determined to meet a long touch threshold.

8. The method of claim 1, wherein the speech of the multi-modal input is received after a duration of the single touch on the display is determined to meet a press and hold threshold.

9. A system comprising:
    a processor; and
    a computer-readable storage medium having instructions stored which, when executed by the processor, cause the processor to perform operations comprising:
    receiving a multi-modal input comprising speech and a single touch on a display, the single touch being at a single point; and
    when the single touch on the display has a duration longer than a threshold duration:
        identifying, based at least in part on a pronoun in the speech, a first set of coordinates having a first meaning for a first object;
        identifying, based at least in part on the pronoun in the speech, a second set of coordinates having a second meaning for a second object;
        associating the first object and the second object with the pronoun in the speech, to yield an association; and
        performing an action based on the speech and the association.

10. The system of claim 9, wherein the threshold duration is based on a context for the single touch on the display.

11. The system of claim 9, wherein the threshold duration is based on a recognition certainty of a command recognized in the speech.

12. The system of claim 9, wherein the speech of the multi-modal input is received simultaneously with initiation of the single touch on the display.

13. The system of claim 9, wherein the speech of the multi-modal input is received after a duration of the single touch on the display is determined to meet a long touch threshold.

14. The system of claim 9, wherein the speech of the multi-modal input is received after a duration of the single touch on the display is determined to meet a press and hold threshold.

15. A computer-readable storage device having instructions stored which, when executed by a computing device, cause the computing device to perform operations comprising:
    receiving a multi-modal input comprising speech and a single touch on a display, the single touch being at a single point; and
    when the single touch on the display has a duration longer than a threshold duration:
        identifying, based at least in part on the pronoun in the speech, a first set of coordinates having a first meaning for a first object;
        identifying, based at least in part on a pronoun in the speech, a second set of coordinates having a second meaning for a second object;
        associating the first object and the second object with the pronoun in the speech, to yield an association; and
        performing an action based on the speech and the association.

* * * * *